United States Patent [19]

Inoue et al.

[11] Patent Number: 5,027,695
[45] Date of Patent: Jul. 2, 1991

[54] VALVE MECHANISM FOR BRAKE BOOSTER

[75] Inventors: Hidefumi Inoue; Yasumasa Morimitsu, both of Saitama, Japan

[73] Assignees: Jidosha Kiki Co., Ltd., Tokyo; Nissan Motor Co., Ltd., Kanagawa, both of Japan

[21] Appl. No.: 323,360

[22] Filed: Mar. 14, 1989

[30] Foreign Application Priority Data

Mar. 31, 1988 [JP] Japan .................................. 63-43826

[51] Int. Cl.⁵ ................................................. F15B 9/10
[52] U.S. Cl. .................................. 91/369.2; 91/369.1; 91/376 R; 137/627.5
[58] Field of Search ............... 91/369.1, 369.2, 376 R; 137/627.5

[56] References Cited

U.S. PATENT DOCUMENTS

| 4,399,736 | 8/1983 | Shubert | 137/627.5 |
| 4,643,076 | 2/1987 | Satoh . | |
| 4,672,883 | 6/1987 | Myers | 91/369.2 |
| 4,770,082 | 9/1988 | Kawasumi | 91/369.2 |
| 4,793,242 | 12/1988 | Kobayashi . | |
| 4,884,491 | 12/1989 | Endo | 91/369.2 |
| 4,936,635 | 6/1990 | Sakaguchi | 91/376 R |

FOREIGN PATENT DOCUMENTS

| 0227554 | 12/1984 | Japan | 91/369.2 |
| 61-64074 | 5/1986 | Japan . | |

Primary Examiner—Edward K. Look
Assistant Examiner—Christopher M. Verdier
Attorney, Agent, or Firm—Flynn, Thiel, Boutell & Tanis

[57] ABSTRACT

A valve mechanism for a brake booster includes a valve element and a valve seat, either of which includes a first seat through which an orifice passage is formed and a second seat. Under an intermediate load condition when a forward movement of an input shaft ceases, the first seats become engaged with each other and the orifice passage is effective to maintain a communication therethrough. Subsequently when the valve element and the valve seat are more strongly abutting together, the second seats engage to interrupt the communication.

6 Claims, 2 Drawing Sheets

FIG.2
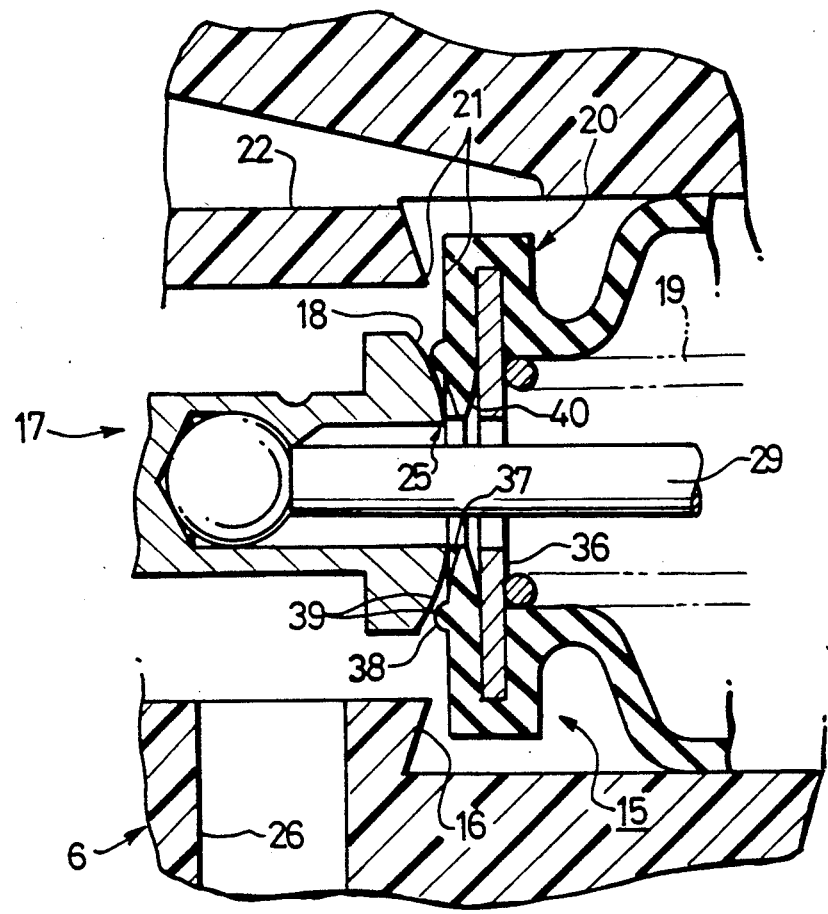
FIG.3
FIG.4
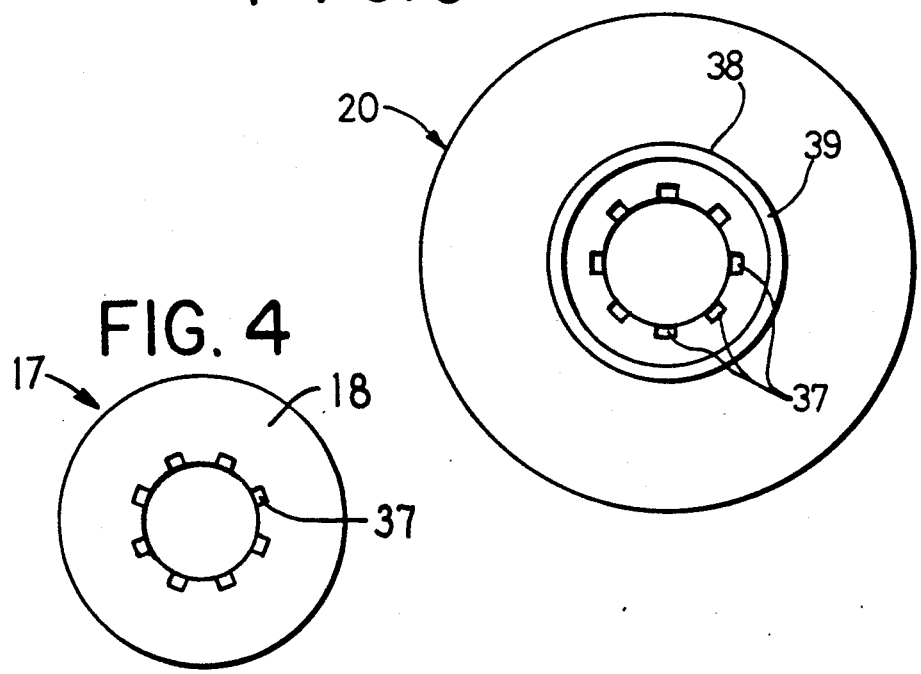

VALVE MECHANISM FOR BRAKE BOOSTER

FIELD OF THE INVENTION

The invention relates to a valve mechanism for a brake booster, and more particularly, to such valve mechanism which provides an enhanced brake feeling to a driver by causing a slightly further increase of braking force after a brake pedal ceases to be depressed.

DESCRIPTION OF THE PRIOR ART

A valve mechanism for a brake booster is known in the prior art including a first annular valve seat which is formed on a valve body, a second annular valve seat which is formed on a valve plunger that is mechanically coupled to an input shaft, and a valve element formed by an elastic material and which is adapted to be seated upon the first and the second valve seat, with an annular seat of the valve element which opposes the second valve seat being formed with an orifice passage which radially extends therethrough (see Japanese Laid-Open Utility Model Application No. 64,074/86).

In the valve mechanism constructed in the manner mentioned above, after a forward movement of the input shaft ceases under an intermediate load condition, an atmospheric pressure can be gradually introduced into a variable pressure chamber of the brake booster through the orifice passage, thereby allowing an output to be increased in retarded manner with respect to the moment when the forward movement of the input shaft has been stopped. The gradual introduction of the atmospheric pressure into the variable pressure chamber allows the degree of abutment of the valve element against the second valve seat to be increased, eventually causing an elastic deformation of the valve element to squeeze the orifice passage to interrupt a communication thereof to thereby cease an increase in the output.

However, with the conventional valve mechanism as mentioned above, an arrangement which allows the elastic deformation of the valve element to squeeze the orifice passage suffers from a difficulty that the elastic material fails to squeeze the orifice passage as it becomes hardened under a low temperature condition, thus requiring an increased degree of abutment of the valve element against the second valve seat in order to interrupt the passage. Consequently, an increase in the output which occurs subsequent to the interruption of the forward movement of the input shaft varies with a temperature change, causing the likelihood of degrading a brake feeding if a greater variation is allowed. The same is true when an orifice passage is formed through the second valve seat defined on a metallic valve plunger and a valve element formed of an elastic material fills the orifice to block it.

SUMMARY OF THE INVENTION

In view of the foregoing, in a valve mechanism for A brake booster as mentioned above; specifically, in a valve mechanism for A brake booster including a first annular valve seat formed on a valve body, a second annular valve seat formed on a valve plunger that is mechanically coupled to an input shaft, and a valve element adapted to be seated upon the first and the second valve seat, with at least one of the valve element and the second valve seat being formed of an elastic material, and second annular seats of the valve element and the second valve seat being formed with an orifice passage which radially extend therethrough, the invention is characterized in that the valve element and the second valve seat are formed with third annular seats in concentric manner with the second annular seats and spaced apart by a greater distance than the second annular seats of the valve element and the second valve seat, so that when the valve element and the second valve seat are in contact with each other under no load, the second annular seats engage each other while allowing a communication of a space between the valve element and the second valve seat through the orifice passage, and so that when the valve element and the second valve seat are brought into abutment against each other above a given level, the second annular seat is subject to an elastic deformation to cause the engagement of the third annular seats with each other, thus interrupting the communication of the space between the valve element and the second valve seat.

With this arrangement, it is only required that the elastic deformation of the second annular seat achieves a mutual engagement of the third annular seats. Accordingly, an influence of a varying hardness of the elastic material can be reduced as compared with an arrangement in which the elastic deformation of the second annular seat is required to block the orifice passage as in the prior art. In this manner, a variation in the increase of the output with a temperature change can be reduced, enabling a stabilized brake feeling to be maintained.

Above objects, features and advantages of the invention will become apparent from the following description of an embodiment thereof with reference to the drawings.

BRIEF DESCRIPTION OF THE DRAWINGS

FIG. 2 is a cross section, to an enlarged scale, of a portion shown in FIG. 1; and FIG. 3 is a left-hand side elevation of a valve element 20 shown in FIG. 2.

FIG. 4 is a right hand view of FIG. 2, showing only element 17 with passages 37 extending therethrough.

DETAILED DESCRIPTION OF EMBODIMENT

Figure 1:
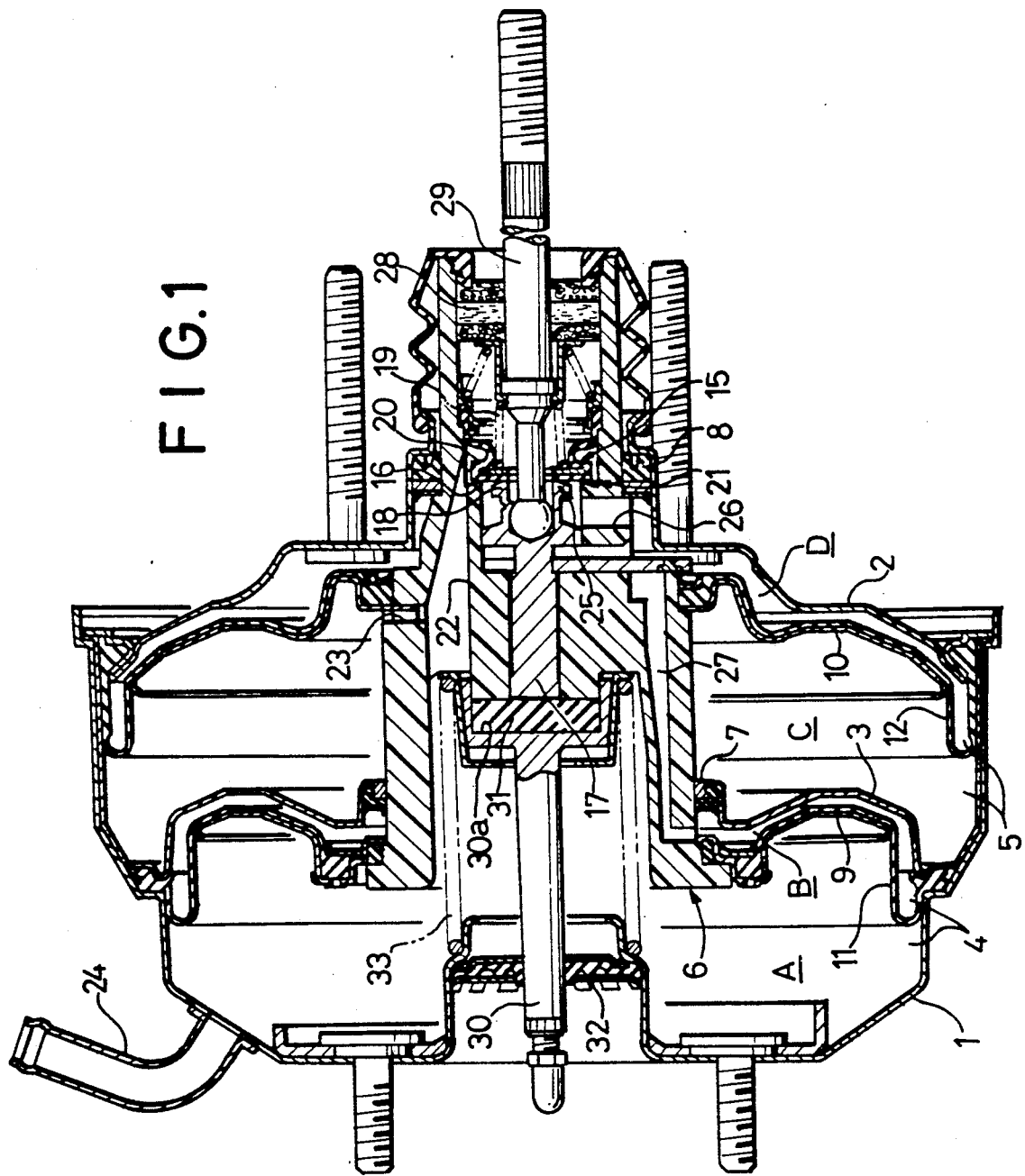
FIG. 1 is a longitudinal section, partly in elevation, of one embodiment of the invention.

Referring to the drawings, an embodiment of the invention will be described. A front shell 1 and a rear shell 2 form together an enclosed vessel, the interior of which is divided by a centrally disposed center plate 3 into a front chamber 4 and a rear chamber 5. A substantially cylindrical valve body 6 formed of a synthetic resin slidably extends through axial portions of the rear shell 2 and the center plate 3, and are hermetically sealed therein by seal members 7, 8, respectively.

Connected to the valve body 6 are a front power piston 9 and a rear power piston 10, which are received in the front chamber 4 and the rear chamber 5, respectively, and a front diaphragm 11 and a rear diaphragm 12 are applied to the back surfaces of the respective power pistons 9, 10, thus defining a constant pressure chamber A and a variable pressure chamber B on the opposite sides of the front diaphragm 11 and also defining a constant pressure chamber C and a variable pressure chamber D on the opposite sides of the rear diaphragm 12.

A valve mechanism 15 which switches a fluid circuit between the pair of constant pressure chambers A, C and the pair of variable pressure chambers B, D is disposed within the valve body 6, and comprises a first annular valve seat 16 formed on the valve body 6, a second annular valve seat 18 formed on the right end of a valve plunger 17 which is slidably disposed within the valve body 6 and located radially inward of the valve seat 16, and a valve element 20 which is urged by a spring 19 to be seated upon either valve seat 16 or 18 from the right hand direction, as viewed in FIG. 1.

A space located radially outward of first annular seats 21 where the first valve seat 16 and the valve element 20 contact each other communicates with the constant pressure chambers A and C through an axial passage 22 and a radial passage 23, and the constant pressure chamber A communicates with an intake manifold, not shown, through a tubing 24 mounted on the front shell 1 for introducing a negative pressure.

The second valve seat 18 and the valve element 20 contact each other at second annular seats 25. A space which is located radially between the first annular seats 21 and the second annular seats 21 and the second annular seats 25 communicates with the variable pressure chamber D through a radial passage 26 formed in the valve body 6 and also communicates with the variable pressure chamber B through an axial passage 27 formed in the valve body 6 and providing a communication between the variable pressure chambers B and D. Finally, a space located radially inward of the second annular seats 25 communicates with the atmosphere through a filter 28.

As mentioned previously, the valve plunger 17 is slidably disposed within the valve body 6 and has its right end connected to an input shaft 29 which is mechanically coupled to a brake pedal, not shown, while the left end of the plunger is disposed in opposing relationship with the right end face of a reaction disc 31 which is received in a recess 30a formed in a push rod 30. The left end of the push rod 30 slidably extends through a seal member 32 to the exterior of the front shell 1 generally in alignment with the axis thereof, for connection with a piston of a master cylinder, not shown. The valve body 6 is normally maintained in its inoperative position, shown, by a return spring 33.

Referring to FIGS. 2 to 4, the valve element 20 is formed of an elastic material such as rubber, and is provided with a ring-shaped backup plate 36 which provides a support for the annular seats 21, 25 along their rear surfaces. The second annular seat 25 of the valve element 20 which is adapted to engage the second valve seat 18 is formed with a plurality of orifice passages 37 which extend radially therethrough, with an annular tab 38, which is continuous circumferentially, formed at a radial position external of the orifice passages 37. The tip of the annular tab 38 defines a third annular seat 39 which is adapted to be seated upon the second valve seat 18.

When the valve element 20 is brought into contact with the second valve seat 18 under no load condition, the spacing between the valve element 20 in the region of the third annular seat 39, and the second valve seat 18 is chosen to be greater than the spacing between the valve element 20 in the region of the second annular seat 25 thereof, and the second valve seat 18 so that when a contact between the valve element 20 and the second valve seat 18 occurs, the second annular seats 25 initially engage each other. Under this condition, the space radially inward of the second annular seats 25 or the space which is connected to the atmosphere will communicate with the variable pressure chamber D through the orifice passages 37, and a clearance between the third annular seat 39 of the valve element 20 and the third annular seat 39 of the second valve seat 18. If the valve element 20 and the second valve seat 18 are now brought into abutting relationship with a force above a given value, the valve element 20 will experience an elastic deformation, whereby the third annular seats 39 will be engaged with each other, thus completely interrupting the communication between the atmosphere and the variable pressure chamber D, which has been allowed previously through the space left between the valve element 20 and the second valve seat 18.

The given value for the abutting force is chosen to be less than the resilience of the spring 19. In order to cause an elastic deformation of the valve element 20 so that the third annular seats 39 can be easily engaged with each other, a circumferentially extending space or relieved portion 40 is formed between the back side of the second annular seat 25 and the plate 36 to facilitate a flexure of the second annular seat 25 of the valve element 20 to the right, as viewed in FIG. 2, whenever an abutting force above the given value is applied across the valve element 20 and the second valve seat 18.

In the described construction and in the inoperative position of the brake booster, the valve element 20 is spaced from the first valve seat 16 while the second annular seat 25 on the valve element 20 is urged by the spring 19 into abutting relationship against the second valve seat 18. Since the resilience of the spring 19 is chosen to be greater than the abutting force, the second annular seat 25 of the valve element 20 will be flexed to the right, as viewed in FIG. 2, whereby the third annular seat 39 of the valve element 20 becomes seated upon the second valve seat 18, thus interrupting the communication which has been allowed through the space left between the valve element 20 and the second valve seat 18.

Under this condition, a communication of the respective variable pressure chambers B and D and the atmosphere is completely interrupted while they are in communication with the constant pressure chambers A and C, respectively, through the clearance between the valve element 20 and the first valve seat 16, whereby all the chambers A to D assume an equal pressure, resulting in a pressure differential across the respective power pistons 9, 10 which is equal to null.

If a brake pedal, not shown, is depressed to drive the input shaft 29 and the valve plunger 17 to the left, the resilience of the spring 19 causes the valve element 20 to be seated upon the first valve seat 16 to interrupt the communication between the constant pressure chambers A and C and the variable pressure chambers B and D. As the valve plunger 17 moves further forward, the second valve seat 18 formed thereon will move away from the valve element 20, whereupon the atmosphere finds its way into the respective variable pressure chambers B and D, producing a pressure differential across each of the power pistons 9, 10 to cause them to be driven forward against the resilience of the return spring 33.

When the input shaft 29 ceases to move forwardly under an intermediate load condition, the valve plunger 17 stops its movement instantaneously while the valve element 20, which moves forward integrally with the first valve seat 16 formed on the valve body 6 as it is seated thereon, has its second annular seat 25 seated upon the second annular seat 25 of the second valve seat 18 which is formed on the valve plunger 17 with a reduced abutting force.

Thereupon, a channel area defined between the valve element 20 and the second valve seat 18 which have been spaced apart to provide a channel area of an increased magnitude now changes into a reduced channel area which is afforded by the orifice passages 37 alone, whereby the atmosphere is gradually introduced into the variable pressure chambers B and D through the orifice passages 37. When the atmosphere is gradually introduced into the variable pressure chambers B and D to a point such that the abutting force acting between the valve element 20 and the second valve seat 18 exceeds the given value, the third annular seat 39 of the valve element 20 becomes seated upon the second valve seat 18, whereby a communication which has been allowed through the space left between the valve element 20 and the second valve seat 18 is now completely interrupted.

As a consequence of such operation, an increase in the output, which occurs with respect to an input of a given value prevailing at the moment when the forward movement of the input shaft 29 ceases, can be retarded as compared with a conventional brake booster, yielding a braking response which imparts a secured brake feeling to a driver.

It is to be understood that the elastic deformation which the second annular seat 25 of the valve element 20 experiences is only required to cause a mutual engagement of the third annular seats 39 rather than requiring that the orifice passages 37 be directly squeezed by such elastic deformation to interrupt the communication therethrough as found in the prior art. Accordingly, any variation in the hardness of the elastic member which may be caused by a temperature change cannot cause a significant change in the magnitude of the abutting force which is required to achieve a mutual engagement of the third annular seats 39. In this manner, a variation in the increase of the output which may be caused by a temperature change can be suppressed low, allowing a stabilized brake feeling to be maintained.

In the described embodiment, the tab 38 is formed on the valve element 20, but it may be formed on the second valve seat 18. Alternatively, the third annular seat 39 may be located radially inward of the second annular seat 25. As a further alternative, the orifice passages 37 may be formed in the second valve seat 18, and it is also possible to apply an elastic member to the second valve seat 18 on the valve plunger 17.

While the invention has been disclosed above in connection with the preferred embodiment thereof, it should be understood that a number of changes, modifications and substitutions will readily occur to one skilled in the art without departing from the spirit and scope of the invention defined by the appended claims.

What is claimed is:

1. A valve mechanism 15 for a brake booster including a first annular valve seat 16 formed on a valve body 6, a second annular valve seat 18 formed on a valve plunger 17 which is mechanically coupled to an input shaft 29 and a valve element 20 which is adapted to be seated upon the first and the second valve seats 16, 18, with the valve element 20 being formed of an elastic material, the valve element 20 and the second valve seat 18 including second annular seats 25, and at least one of said second annular seats having orifice passages 27 which extend radially therethrough;

characterized in that the valve element 20 and the second valve seat 18 are formed with third annular seats 39 which are concentric with said second annular seats thereof and which are axially spaced apart by a distance which is greater than the axial spacing between the second annular seats, so that when the valve element 20 and the second valve seat 18 are in contact with each other under no load, the second annular seats 25 engage each other but the axially spaced third annular seats permit fluid flow between the valve element 20 and the second valve seat 18 through the orifice passages 37, and so that when the valve element 20 and the second valve seat 18 are brought into abutting relationship with an abutting force of a given magnitude or greater, said elastic valve element experiences an elastic deformation to cause a mutual engagement of the third annular seats 39 to interrupt fluid flow between the valve element 20 and the second valve seat 18, and said valve element having a relieved portion formed in the back surface of the second annular seat thereof which allows the second annular seat to be flexed in a direction away from the second valve seat.

2. A valve mechanism 15 according to claim 1 in which the valve element 20 is urged toward the second valve seat by a spring 19 which is disposed between the valve element and the input shaft 29, the spring 19 having a resilience of a magnitude which is sufficient to cause a mutual engagement of the third annular seats 39 whenever the resilience of the spring 19 has caused the valve element 20 to be seated upon the second valve seat 18.

3. A valve mechanism 15 according to claim 1 in which the third annular seat 39 on the valve element 20 is formed as an annular tab 38.

4. A valve mechanism 15 according to claim 1 or 3 in which the orifice passages 37 are formed in the valve element 20.

5. A valve mechanism 15 according to claim 4 in which the valve element 20 is urged toward the second valve seat by a spring 19 which is disposed between the valve element and the input shaft 29, the spring 19 having a resilience of a magnitude which is sufficient to cause a mutual engagement of the third annular seats 39 whenever the resilience of the spring 19 has caused the valve element 20 to be seated upon the second valve seat 18.

6. A valve mechanism 15 according to claim 3 in which the valve element 20 is urged toward the second valve seat by a spring 19 which is disposed between the valve element and the input shaft 29, the spring 19 having a resilience of a magnitude which is sufficient to cause a mutual engagement of the third annular seats 39 whenever the resilience of the spring 19 has caused the valve element 20 to be seated upon the second valve seat 18.

* * * * *

UNITED STATES PATENT AND TRADEMARK OFFICE
CERTIFICATE OF CORRECTION

PATENT NO. : 5 027 695

DATED : July 2, 1991

INVENTOR(S) : Hidefumi Inoue et al

It is certified that error appears in the above-identified patent and that said Letters Patent is hereby corrected as shown below:

Column 6, line 4; change "27" to ---37---.

Signed and Sealed this

Sixteenth Day of February, 1993

*Attest:*

STEPHEN G. KUNIN

*Attesting Officer*  *Acting Commissioner of Patents and Trademarks*